United States Patent [19]
Shah

[11] 3,932,337
[45] Jan. 13, 1976

[54] THERMOPLASTIC URETHANE COMPOUND HAVING LOW COMPRESSION SET AND HIGH MODULUS

[75] Inventor: Kanu G. Shah, Arlington Heights, Ill.

[73] Assignee: The Richardson Company, Des Plaines, Ill.

[22] Filed: Apr. 25, 1974

[21] Appl. No.: 464,050

[52] U.S. Cl. .................. 260/29.1 SB; 260/77.5 AN
[51] Int. Cl.² .................... C08G 18/61; C08K 3/34
[58] Field of Search...260/2.5 AH, 77.5 R, 77.5 AN, 260/29.1 SB, 2.5 AN

[56] References Cited
UNITED STATES PATENTS

| | | | |
|---|---|---|---|
| 2,990,379 | 6/1961 | Young et al. | 260/2.5 AH |
| 2,992,940 | 7/1961 | Pace | 260/2.5 AH |
| 3,296,063 | 1/1967 | Chandler | 260/29.1 SB |
| 3,523,101 | 8/1970 | Reuter | 260/77.5 AN |
| 3,585,065 | 6/1971 | Johnson | 260/77.5 R |
| 3,591,561 | 7/1971 | Kazama et al. | 260/2.5 AN |
| 3,645,775 | 2/1972 | Schulze et al. | 260/77.5 R |
| 3,651,021 | 3/1972 | Kincaid et al. | 260/77.5 AN |
| 3,745,203 | 7/1973 | Harper | 260/2.5 AZ |
| 3,775,354 | 11/1973 | Hostettler et al. | 260/2.5 AN |

OTHER PUBLICATIONS

Union Carbide New Product Data: Niax$^{(R)}$ Caprolactone Polyols for Moisture–Cure Urethane Coatings, Oct., 1967.

Phillips, L. N. and D. B. V. Parker, Polyurethanes, Iliffe Books Ltd., (London 1964), pp. 71–72.

*Primary Examiner*—H. S. Cockeram
*Attorney, Agent, or Firm*—Alan M. Abrams; John L. Hutchinson

[57] ABSTRACT

A thermoplastic polyester urethane molding composition is disclosed having low compression set and high elastic modulus and which comprises the reaction product of a poly(epsilon-caprolactone) polymer, a hydroxy terminated polyol, an organic diisocyanate and a siloxane polymer. More specifically, by adding the siloxane polymer and maintaining a mole ratio of isocyanate to isocyanate-reactable hydroxy grouping in the range of from about 1.05 to about 1.3 or higher, it is possible to produce an improved molding composition having allophanate cross-links. The allophanate linkage breaks down at molding temperatures and reforms upon cooling thereby allowing an easily moldable thermoplastic urethane polyester which, after molding, will maintain its shape and have characteristics of a thermoset material. Additionally, the use of the siloxane polymer improves certain physical properties of the reaction product such as tensile and modulus of elasticity.

4 Claims, No Drawings

THERMOPLASTIC URETHANE COMPOUND HAVING LOW COMPRESSION SET AND HIGH MODULUS

BACKGROUND OF THE INVENTION

1. Field of the Invention

This invention relates to thermoplastic polyester-urethane molding compositions having certain advantageous molding and physical properties for use in sealing mechanisms where low compression set and good physical properties are required.

2. Description of the Prior Art

Epsilon-caprolactone is known to polymerize with a polyhydric alcohol or a glycol-type material to form a hydroxy terminated polyester which, when mixed along with a diol chain extender and a diisocyanate of the organic type, can be used to form relatively long chain polyester-polyurethane polymers. Such polymers are presently known in the industry to be useful in many applications including injection and compression molding.

Exemplary of art using caprolactones is U.S. Pat. No. 3,658,756 which discloses the use of a caprolactone hydrolyzate or alcoholizate which is reacted with a glycol to form a polyester material. Such polyester material is then reacted with an organic diisocyanate and a chain extender such as a glycol material to form a polyester-urethane material.

It is also known to utilize excess ratios of diisocyanate to isocyanate-reactable hydroxyl groups in the polyester-polyurethanes in order to form allophanate cross-linking bonds. More specifically, the excess isocyanates can react through the carbon atom of such isocyanate to the nitrogen atom in the urethane grouping in the polyester-polyurethane thereby forming the allophanate cross-links.

It has been found that such allophanate linkages break down at relatively high temperatures and reform upon cooling forming a material which is thermosetting in character. At the higher temperature the allophanate linkage can break or be severed allowing the material to possess more of the thermoplastic properties which enhance molding operations.

However, I have found that, in addition to the above use of the epsilon-caprolactone with chain extenders and diisocyanates and the use of excess diisocyanate to produce allophanate linkages, unexpected improvement properties can result when there is incorporated in the reactant mixture an organic siloxane polymer. Such polymer provides and also increases the physical properties of the molded product. In a specific instance such addition will increase tensile strength, elongation percentage and a 100 and 300% modulus elasticity properties.

SUMMARY OF THE INVENTION

The present invention can be summarized as a thermoplastic urethane having low compression set and high elastic modulus comprising the reaction product of a poly(epsilon-caprolactone) polymer, a hydroxy terminated chain extender, an organic diisocyanate and a siloxane polymer.

In a broad embodiment my invention relates to a thermoplastic urethane having low compression set and high elastic modulus comprising the reaction product of a poly(epsilon-caprolactone) polymer having the following general formula:

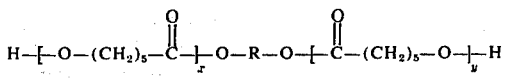

wherein R is alkyl, alkenyl or aryl having from one, two and six carbon atoms respectively, to about 10 carbon atoms; a hydroxy terminated polyol; an organic diisocyanate; and a siloxane polymer having the following general formula:

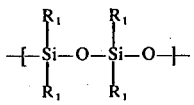

wherein $R_1$ is alkyl, alkenyl or aromatic; having a molar ratio of isocyanate groups to isocyanate-reactable hydroxy group of from about 1.05 to about 1.3.

DETAILED DESCRIPTION OF THE INVENTION

The present improved composition comprises a thermoplastic polyester-polyurethane which has low compression set and high elastic modulus comprising the reaction product of four materials of which three enter into chemical reactions to form a polyester-polyurethane composition having allophonate cross-links. The fourth material is a siloxane polymer not thought to enter into reaction with the other three components.

One of the reactants used to produce thermoplastic polyester-polyurethane is a poly(epsilon-caprolactone) polymer which is produced by the reaction of epsilon caprolactone and glycol or polyhydric alcohol. Specifically such reaction mechanism is shown in the equation below:

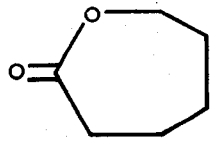 + HOROH → 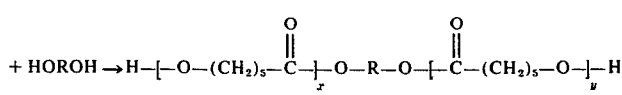

where x and y can vary depending on the ratio of the reactants and R can be alkyl, alkenyl, aryl or other similar type material. In a preferable instance the R is alkyl having a reasonably low molecular weight.

Poly(epsilon-caprolactone) can be purchased from the Union Carbide Corporation, Chemical and Plastics Division. They generally are referred to under the registered trademark of "NIAX" polyols and have product identifications such as D-510, D-520, D-540 and D-560. The average molecular weight and other physical properties of such polyols can vary depending upon method of production, the ratio of the reactants, etc. Specifically the D-510 polyol has an average molecular weight of 530, the D-520 has a molecular weight of about 830, the D-540 polyol has a molecular weight of about 1,250 while the D-560 polyol has a molecular weight of approximately 2,000.

Another of the reactants used to produce polyester-polyurethane is a hydroxy terminated polyol, more typically referred to as a chain extender. Such materials can react with the epsilon caprolactone which has been reacted with a glycol or dihydric alcohol to form a polyester-polyurethane polymer. Specifically, the hydroxy terminated polyols such as lower alkyl glycols, for example, ethylene glycol, 1,4 butane diol, di-ethylene glycol, propylene glycol or the like are preferred. It is especially preferred that the hydroxy terminated polyols have no pendant hydroxyl groupings present within the chain other than those at the terminal or end portions of the polyol to prevent cross-linking between the polyester-polyurethane chains through such pendant hydroxy groupings. It is preferred that 1,4 butane diol be utilized as the chain extender.

The third reactant utilized to produce the above polyesterpolyurethane polymer is a suitable organic diisocyanate selected from 2,4 toluene diisocyanate, 2,6 toluene dissocyanate, 1,5 naphthalene diisocyanate, 1,4 di-ethyl benzyl beta-diisocyanate, 4,4 diphenylmethane diisocyanate, toluene diisocyanates or other similar type aromatic, aliphatic or cycloaliphatic diisocyanates.

The ratio of isocyanate to hydroxyl groups in the reaction mixture should be from about 1.05:1 to about 1.3:1 or greater. In a preferred instance, the ratio of isocyanate groups to isocyanate-reactable hydroxy groups should vary within the range of from about 1.05:1 to about 1.15:1. Such ratios of the diisocyanate to the hydroxyl groups are preferred in order to cause formation of the allophanate cross-linking mechanism. Such mechanism is shown in the equation below and is thought to take place at the nitrogen atom of the urethane segment of the polyester-polyurethane polymer.

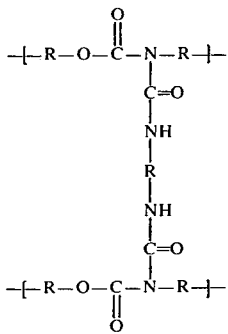

In the above equation the vertical cross-linking member is referred to as allophanate linkage.

The allophonate breaks down at molding temperatures forming a diisocyanate material and reforms upon cooling. Accordingly, by utilizing a controlled excess quantity of diisocyanate it is possible to produce a material which, at high molding temperatures, is essentially thermoplastic (substantially no cross-linking occuring between the polyester-polyurethane chains). After cooling the allophanate linkage reforms causing crosslinking to take place between the long polyester-polyurethane chains giving the molded product advantages over comparable polyester-polyurethane materials which do not contain the allophonate linkage.

The fourth component of the claimed composition is a siloxane polymer which is generally represented by the recurring structural formula as shown below:

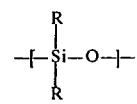

wherein R is generally an alkyl of low molecular weight. The siloxane polymer as shown above is not thought to enter into a chemical reaction with the other three components of the present composition. In some instances the R grouping above may be aryl or alkenyl or combinations of alkyl, aryl or alkenyl. It may also be partially or totally substituted with halogens or similar materials.

The siloxane polymer improves the tensile and elongation properties of the molded product. Such improvement in properties is unexpected since the siloxane polymer is not thought to enter into a chemical reaction with the other three components and accordingly would be expected to degrade the physical properties of the produced polyester-polyurethane material.

Depending upon the physical properties required for the molded composition, pure reactants or mixtures thereof may be used to produce the claimed composition.

In preparing the polyester-polyurethane polymer claimed herein, the poly(epsilon-caprolactone) polymer should be present as from about 7.5 to about 13 mole percent of the total reactants. Of course, this value will vary depending upon the particular poly(epsilon-caprolactone) polymer utilized but, when using approximately 50-50 mole of NIAX polyols D-560 and D-540, it is preferred that roughly 10.5 mole percent of the reactants be these two components.

The hydroxy terminated polyol can be present anywhere from about 33 to about 41 mole percent of the reactants. Such hydroxy terminated polyols, commonly referred to as chain extenders, preferably vary from around 35 to about 39 or even more preferably around 37 mole percent of the total moles of reactants.

The diisocyanate of the organic type can vary anywhere from about 48 to about 57 mole percent of the total moles of the reactants and preferably should be somewhere around 52 mole percent of the total moles of reactants. It is preferable to regulate either the quantities of the poly(epsilon-caprolactone) polymer, the hydroxy terminated polyol or the organic diisocyanate in order to maintain a ratio of isocyanate groups to the isocyanate-reactable hydroxy groups of anywhere from about 1.05:1 to about 1.3:1. An even more preferable range of such ratios can be from about 1.05:1 to about 1.15:1.

The siloxane polymer as described above should be present anywhere from a few tenths of a weight part per hundred to as many as 1 part per hundred by weight of the total reactants.

In producing the reaction product of the above components various procedures can be utilized.

In a preferable instance the poly(epsilon-caprolactone) polymer can be heated at about 100°C and degassed to remove dissolved gases and water vapors therefrom. Similarly, the hydroxy terminated polyols such as 1,4 butane diol can be degassed either at the elevated temperature or at room temperature. The poly(epsilon-caprolactone) polymer can be heated to about 150°C and the required amount of the hydroxy terminated polyol can thereafter be added to the mixture. The material can be mixed for a few minutes and then a pre-weighed quantity of the organic diisocyanide can be added and mixed very vigorously. Thereafter the mixture can be cast into a mold, cured for approximately 3 to 3 ½ hours at 300°F and thereafter granulated. The granulated polymer can then be processed by thermoplastic processing equipment.

Other methods of producing such polymers can be used.

The following examples are presented to illustrate the specific embodiments of the compositions of this invention and should not be utilized to unduly restrict the scope of the claims.

EXAMPLE

In this example two polymeric reactant products were produced using substantially identical processing conditions except that one of the compositions produced (composition B) had added to it approximately 0.5 parts per hundred by weight of Dow Corning siloxane polymer DC 200, generally referred to as dimethyl siloxane polymeric material.

The reaction procedures were as follows: Polyol D-560 and D-540 were heated at 100°C and degassed for one hour at 5 mm of mercury. The 1,4 butane diol was degassed at room temperature for one hour. The mixture of D-560 and D-540 NIAX polyols were then heated to approximately 140° to 150°C and the required amount of the hydroxy terminated polyol (1,4 butane diol) was added to the polyol mixtures and mixed very thoroughly for 5 minutes. The predetermined quantity of diphenylmethane diisocyanate was then added and the material was mixed very vigorously and thereafter cast into a mold. The material was cured for approximately 3 to 3 ½ hours at 300°F then granulated.

Injection molded samples of the granulated polymeric materials produced above were then used to make test bars which were tested for various properties such as hardness, tensile strength, elongation and tensile modulus at 100 and 300% modulus.

The table below illustrates the differing properties for composition A and composition B produced as described above.

| COMPONENT | COMPOSITIONS, MOLE % | |
|---|---|---|
| | A | B |
| Polyol D-560 | 6.3 | 6.3 |
| Polyol D-540 | 4.2 | 4.2 |
| 1,4 Butane diol | 37.0 | 37.0 |

-continued

| COMPONENT | COMPOSITIONS, MOLE % | |
|---|---|---|
| | A | B |
| 1,4' Diphenylmethane diisocyanate | 52.5 | 52.5 |
| Siloxane polymer | — | 0.5 (parts by wt. phr) |
| TOTAL | 100.0 | 100.0 |
| PHYSICAL PROPERTIES | A | B |
| Hardness (Shore A) | 93 | 92 |
| Tensile (ASTM 412), psi | 6010 | 6300 |
| 100% modulus, psi | 1520 | 1830 |
| 300% modulus, psi | 3240 | 3930 |
| Elongation, % | 440 | 475 |
| Rebound (ASTM D-2632) | 30 | 28 |
| Compression Set (ASTM D-1238 method B, 70 hrs. at 158° F) | 29 | 30 |

I claim as my invention:

1. A plastic molding composition exhibiting thermoplastic properties at molding temperatures and thermoset properties at room temperature which comprises
    A. The reaction product of:
        1. from about 7.5 to about 13 mol percent of a poly(epsilon-caprolactone) polymer having the general formula:

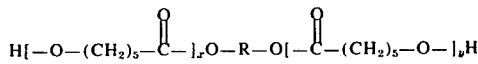

wherein R is alkyl, alkenyl aryl having from one to 10 OH. carbon atoms, where $x$ and $y$ can vary depending on the ratio of the reactants,
        2. from about 33 to about 41 mol percent of a lower alkyl glycol, and
        3. from about 48 to about 57 mol percent of an organic diisocyanate;
    and having a molar ratio of isocyanate groups to isocyanate reactable hydroxy groups of from about 1.05 to 1.15; and
    B. from about 0.3 to about 1.0 parts per 100 parts by weight of said reaction product of a siloxane polymer having the following general formula:

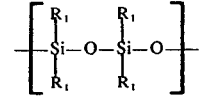

wherein $R_1$ is alkyl, alkenyl or aromatic.

2. Claim 1 wherein said hydroxy terminated polyol comprises: $HO(CH_2)_4OH$.

3. Claim 1 wherein said organic diisocyanate comprises 4,4-diphenylmethane diisocyanate.

4. Claim 1 wherein $R_1$ is methyl.

* * * * *